July 31, 1951   C. S. KOWALSKI   2,562,799
PARACHUTE WITH STABILIZING BAND
Filed April 11, 1946   2 Sheets-Sheet 1

INVENTOR.
CONRAD S. KOWALSKI
BY Albert Sperry.
ATTORNEY

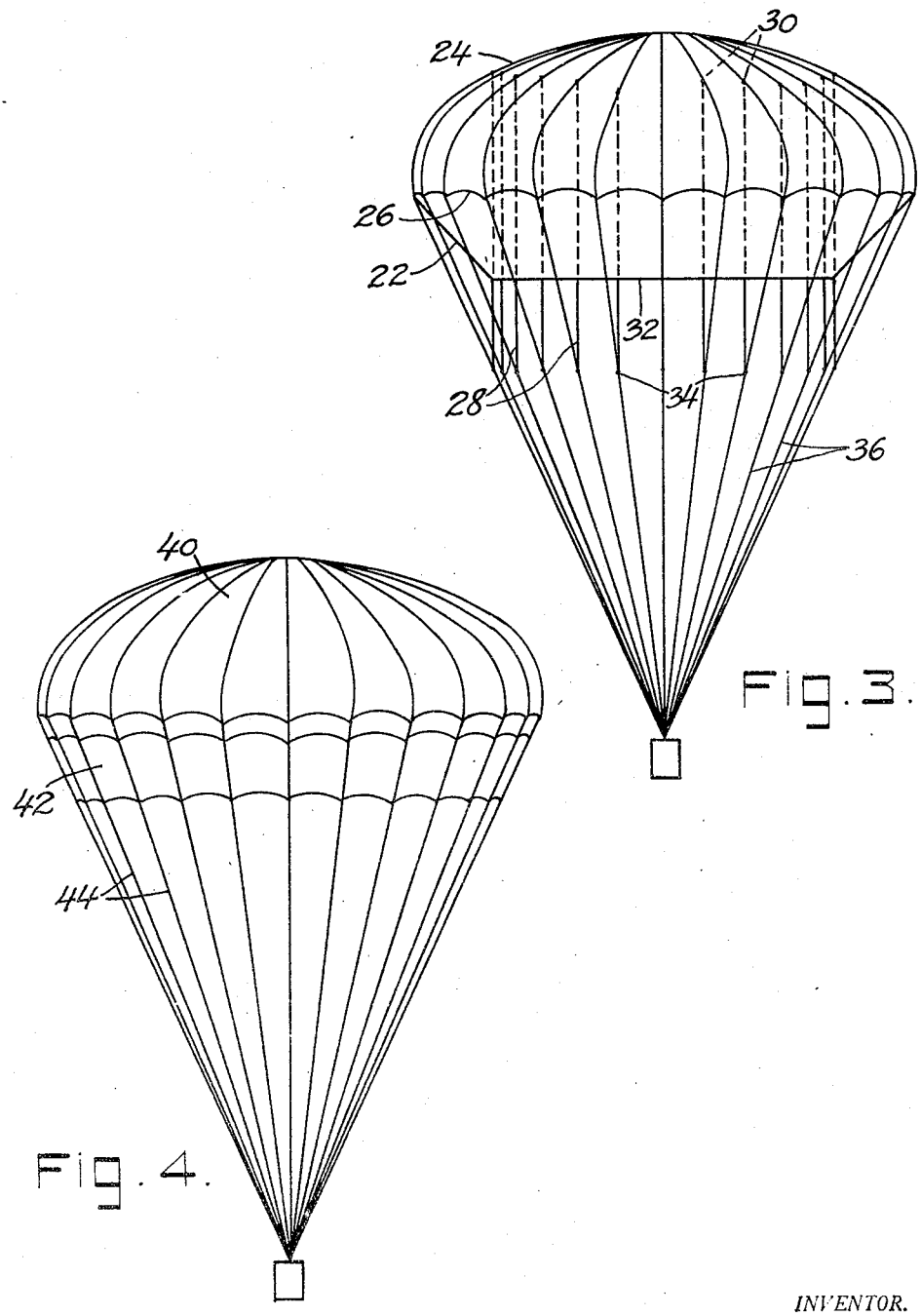

Patented July 31, 1951

2,562,799

UNITED STATES PATENT OFFICE 2,562,799

PARACHUTE WITH STABILIZING BAND

Conrad S. Kowalski, Manchester, Conn., assignor to Pioneer Parachute Company, Inc., Manchester, Conn., a corporation of Connecticut Application April 11, 1946, Serial No. 661,413

20 Claims. (Cl. 244—145)

My invention relates to parachutes and particularly to constructions which insure stability and decrease oscillation of the parachute and of the user or load during descent. My invention further relates to constructions whereby shock loading of the parachute is prolonged and its severity reduced.

One of the most serious hazards to which users of parachutes are subjected is that due to oscillation or swinging of the parachute as it approaches the ground for although the descent itself may be relatively slow and safe, the user may be thrown forcibly to the ground by swinging of the parachute during the final moments of descent. This danger has long been recognized and is probably the most frequent cause of injury of those using parachutes. Even experienced parachute jumpers who know how to manipulate the suspension lines so as to decrease oscillation often are unable to prevent a parachute from oscillating violently, particularly in a strong or gusty wind.

Another serious objection to parachutes of the prior art is that due to the sharp and forcible shock loading to which the canopy and user are subjected when the canopy opens. This shock is greatly increased and may even be fatal if the parachute is released from aircraft traveling at a very high speed.

Many attempts have been made to provide parachutes with special constructions or means for use in reducing oscillation or swinging of the parachutes and its load but no non-oscillating parachute heretofore has ever proven sufficiently successful to be adapted and used widely. Moreover, many special constructions have been designed for the purpose of reducing or relieving shock loading to which parachute canopies and loads are subjected but the improvements thus effected have been limited.

In accordance with my invention parachutes are provided with stabilizing means which are simple, safe and effective in operation. The means employed also serve to reduce or to prolong the effects of shock loading of the canopy so that they are much less severe.

The constructions used to attain these advantages may vary considerably but in general they embody an inwardly and downwardly extending stabilizing surface formed of fabric and located below the outer periphery of the supporting portion of the canopy to steer or direct the canopy and its load into vertical positions by action which may be compared with that of the pointed bow of a boat or the inclined leading faces of a snow plow. This construction further serves to restrict and prolong the entry of air into the canopy during the initial period of opening of the canopy so that shock loading of the parachute is prolonged and its severity is decreased.

The principal object of my invention is to reduce oscillation or swinging of a parachute and its load.

Another object of my invention is to reduce and prolong the effects of shock loading of a parachute.

A further object of my invention is to provide a parachute with novel means for stabilizing its descent and decreasing shock loading.

Another object of my invention is to provide a novel form of parachute which is stable, safe and economical to produce.

A particular object of my invention is to provide a parachute with stabilizing and shock reducing means located below the outer periphery of the supporting portion of the canopy and extending inwardly and downwardly below the periphery so as to dampen oscillation and restrict entry of air into the canopy during initial opening thereof.

These and other objects and features of my invention will appear from the following description thereof in which reference is made to the figures of the accompanying drawings.

In the drawings:

Figs. 3 and 4 illustrate typical alternative constructions embodying my invention.

Figure 1:
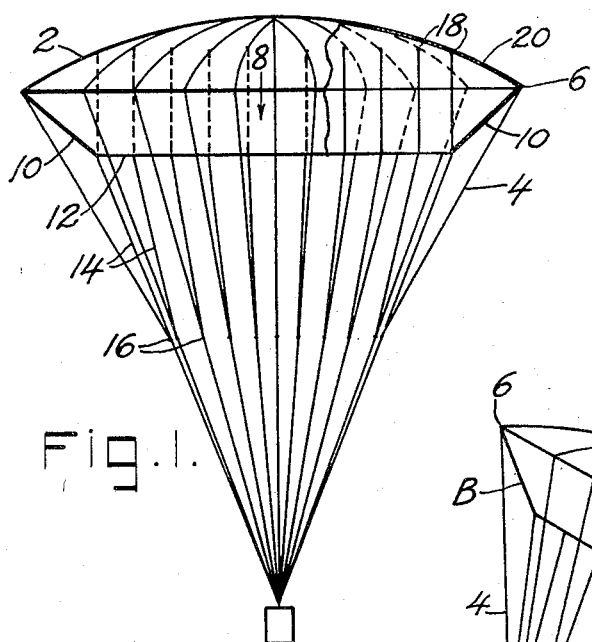
Fig. 1 is a vertical sectional view through the canopy and upper portion of the suspension lines of a typical parachute embodying my invention.
Figure 2:
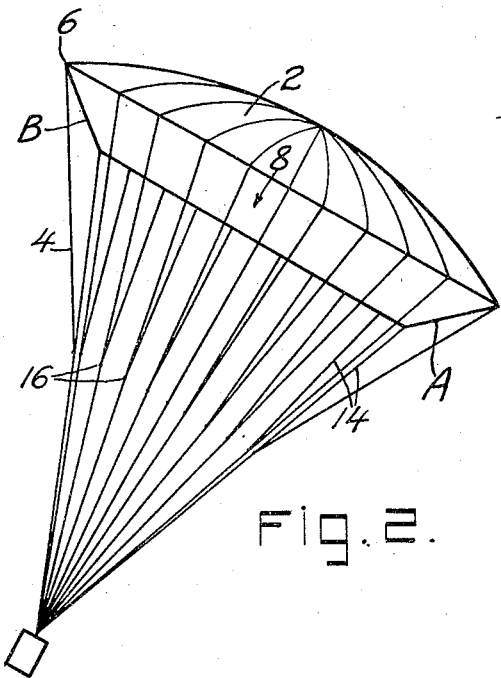
Fig. 2 is a diagrammatic side elevation of the parachute of Fig. 1 as seen when in a tilted position.

In that form of my invention chosen for purposes of illustration in Figs. 1 and 2 the parachute embodies a canopy having a load supporting portion 2 with suspension lines 4 connected to the outer periphery 6 thereof. Air deflecting means consisting of a canopy portion indicated generally at 8 is connected to the canopy portion 2 adjacent its outer periphery 6 and presents inwardly and downwardly inclined air deflecting surfaces 10. The portion 8 preferably is formed of fabric or other material similar to that used in forming the load supporting portion of the canopy but both the material and the porosity of the portion 8 may differ from that of the portion 2.

The canopy portion 8 and the air deflecting surface 10 terminate at the lower inner edge 12 to which other suspension lines 14 are connected. The suspension lines 4 and 14 are preferably connected together, as shown at 16, below the lower edge 12 of the canopy portion 8 and extend upward from the point 16 beyond the lower inner edge 12 of the canopy portion 8 to the load supporting portion 2 of the canopy. The upper ends of the suspension lines 14 are connected to the canopy portion 2 at the points 18 spaced inward from the outer peripheral edge 6 thereof and preferably are also connected to those portions 20 of the suspension lines 4 which extend over the load supporting portion of the canopy. The suspension lines 14 preferably are arranged to extend vertically upward from the points 16 to the points 18 when the parachute is in use and cooperate with the lines 4 in supporting the load. Both sets of suspension lines therefore are relatively taut during descent and serve to hold the air deflecting surfaces 10 so extended and positioned that they serve to deflect air outwardly from below the canopy toward the peripheral edge 6 of the load supporting portion 2 of the canopy. The surface 10 thus may be said to steer or direct the canopy toward a vertical position during descent.

The action of the surfaces 10 is illustrated more clearly in Fig. 2 where the canopy is shown in a tilted position. When thus displaced, as it will be during the initial period of opening of the parachute, the side A of the deflecting surface 10 adjacent the lower or right hand edge of the canopy as seen in Fig. 2 presents an extended surface which is disposed substantially horizontally and offers effective resistance to the air through which the parachute descends. At the same time oppositely located side B of the surface 10 presents a surface which is disposed nearly vertically and offers little or no resistance to the air through which the parachute descends. Moreover, the downwardly extending side B of the portion 8 serves to prevent spilling of the air from beneath the upper edge of the canopy as it is tilted so that the upper edge remains supported and settles relatively slowly. The parachute therefore returns to a vertical position without any collapsing of the upper edge and without the sudden falling, side slipping and accelerated swings which are usual when a conventional parachute oscillates.

The retention of air within the canopy by the air deflecting portion 8 also renders it possible to employ canopies which are much flatter than those heretofore in common use with the result that the diameter of the canopy may be increased without increasing the amount of material employed in making the parachute. The suspension lines 14 also aid in holding the canopy relatively flat while the air deflecting surfaces 10 of the canopy portion 8 prevent or reduce oscillation of the canopy and swinging of the user or load.

A further characteristic feature of constructions embodying my invention resides in reduction in intensity of the shock loading of the canopy and its load. The restricted opening into the upper portion of the canopy afforded by the inner edge 12 of the canopy portion 8 serves to limit or prolong the entry of air into the peak of the canopy during the initial stages of opening and as a result the load supporting portion 2 of the canopy is not extended to its full diameter so rapidly as heretofore. The parachute therefore opens more slowly and the period of deceleration is prolonged reducing intensity of the shock loading.

In actual tests of parachutes constructed as illustrated in Figs. 1 and 2 the time of opening of the canopy is prolonged and its oscillation is almost completely eliminated after the first one or two swings during which the canopy assumes a vertical position. Thus, tests have shown that whereas a standard parachute having a canopy 24 feet in diameter normally opens in from one half to one second, parachutes constructed as illustrated in Fig. 1 and having a load supporting portion 24 feet in diameter generally require from 1½ to 2 seconds to open. This reduced speed of opening serves to prolong and reduce the severity of the shock loading resulting from deceleration of the load as indicated by tensiometer records taken during such tests. In a typical case the tension to which the suspension lines, canopy and load are subjected upon opening of a standard Army parachute 24 feet in diameter is in the neighborhood of 1200 to 1400 pounds when dropped from an aeroplane traveling at 100 miles per hour, the parachute carrying a load of 150 pounds. By way of contrast when using a parachute constructed as illustrated in Fig. 1 the tension to which the canopy and load are subjected under similar conditions is only about 800 to 900 pounds.

High speed moving pictures of a parachute embodying my invention further show that there is a tendency for the lower portions of the canopy to be drawn inward so that it restricts the opening through which air enters the canopy during the initial stages of opening thus confirming my belief that the prolonged shock loading and its reduction in intensity are largely due to the action of the canopy portion 8 and its deflecting surfaces 10. Furthermore, these pictures show that oscillation of the parachute causes suspension lines which are connected together at a point above the load, as shown at 16 in the drawings, to act as a compound pendulum. As a result, shifting of the load to either side from a central position serves to cause the suspension lines 4 on that side of the parachute to be relieved in tension or even to become loose and slack while the load is distributed to the other suspension lines thereby restoring the parachute to a vertical position.

While the preferred form of my invention heretofore used and tested has a relatively flat load supporting portion, I have also applied an air deflecting canopy portion to a standard Army parachute, as an added element for increasing its stability during descent. A construction of this type is illustrated in Fig. 3 where an air deflecting canopy portion 22 is applied to a parachute having a conventional load supporting canopy portion 24. The upper outer edge of the air deflecting canopy portion 22 is preferably secured to the skirt or outer peripheral edge 26 of the load supporting portion 24, whereas the lower inner edge of the portion 22 is held in place by supplementary suspension lines 28 which have their upper ends tacked or secured to the canopy at points 30 spaced inward from the skirt or outer peripheral edge 26. The suspension lines 28 are attached to the lower inner edge 32 of the portion 22 whereas the lower ends of suspension lines 28 are secured at 34 to the usual suspension lines 36 of the parachute.

The operation of the construction illustrated in Fig. 3 is substantially the same as that of Fig. 1 in that oscillation of the parachute and swinging of its load is substantially eliminated and the canopy opens more slowly and shock loading of the parachute is prolonged and reduced in intensity. It is thus apparent that air deflecting means consisting of a canopy portion such as that shown at 22 in Fig. 3 may be produced independently of the parachute itself and can be attached to existing parachutes to reduce oscillation or swinging of the user or load.

As further illustrated in Fig. 4 an alternative form of air deflecting canopy portion may be applied to existing parachutes by simply attaching to the usual suspension lines a side strip of fabric which extends about the parachute from one suspension line to another. The parachute then has a load supporting canopy portion 40 and an air deflecting canopy portion 42 which lies substantially parallel to the suspension lines 44 and presents a downwardly and inwardly inclined air deflecting surface of general conical form. The angle of inclination is not as great as in the construction of Figs. 1 and 3, but no extra suspension lines are required.

It is usually preferable in each of the forms of my invention to locate the upper edge of the canopy portion which serves as the air deflecting means adjacent the skirt or outer periphery of the load supporting portion of the canopy. However, as shown in Fig. 4 the air deflecting canopy portion may be spaced from the periphery or skirt of the load supporting of the canopy if desired. The preferred angle of inclination of the air deflecting portion of the canopy is approximately 30 to 45° from a horizontal position when the parachute is descending vertically, however, as illustrated in Fig. 4, this angle may be varied considerably and may be as much as 75° from horizontal. The width of the air deflecting portion from its lower inner edge to its upper outer edge may also be varied considerably but in practice I have found that the construction of Fig. 1 operates very effectively when the canopy portion 8 is equal in width to from about 5 to 20% of the diameter of the load supporting portion of the canopy when in use.

I also prefer to employ air deflecting means which extend completely around the parachute but it will be apparent that separate panels located on opposite sides of the parachute canopy can be employed if desired.

In each of the forms of my invention shown and described, the air deflecting means serves to restore the canopy to a vertical position and to damp out oscillations so that the parachute remains in a substantially vertical position during descent and swinging of the user or load is practically eliminated. Moreover, the opening of the canopy is delayed or retarded so that shock loading is materially reduced.

While I have illustrated and described various alternative forms of parachute embodying my invention, it will be understood that numerous other changes and modifications may be made in the form, construction and arrangement of the elements employed and in view thereof it should be understood that the constructions shown in the drawings and described above are intended to be illustrative and are not intended to limit the scope of my invention.

I claim:

1. A parachute having a canopy with an upper load supporting portion, suspension lines connected to the canopy adjacent the outer periphery of said load supporting canopy portion, and means connected to the parachute and symmetrically disposed on opposite sides thereof and presenting inwardly and downwardly inclined air directing surfaces located below and spaced from the outer periphery of the load supporting portion of the canopy.

2. A parachute having a canopy with an upper load supporting portion, suspension lines connected to the canopy adjacent the outer periphery of said load supporting canopy portion, and means connected to the parachute and presenting an inwardly and downwardly inclined air deflecting surface extending throughout the circumference of the parachute and located below the outer periphery of the load supporting portion of the canopy.

3. A parachute having a canopy with an upper load supporting portion, suspension lines connected to the canopy adjacent the outer periphery of said load supporting canopy portion, and means connected to the outer periphery of the load supporting portion of the canopy presenting air deflecting surfaces inclined inwardly and downwardly from said outer periphery throughout the circumference of the parachute.

4. A parachute having a canopy with an upper load supporting portion, suspension lines connected to the canopy adjacent the outer periphery of said load supporting portion, air deflecting means connected to said canopy portion adjacent said outer periphery and presenting air deflecting surfaces inclined inwardly and downwardly from said periphery to a lower inner edge, and other suspension lines connected to said air deflecting means adjacent said lower inner edge and connected to said canopy at points spaced inward from said outer periphery.

5. A parachute having a canopy with an upper load supporting portion, means presenting air deflecting surfaces inclined inward and downward from the outer periphery of said load supporting canopy portion to a lower inner edge, a group of suspension lines connected to the load supporting portion of the canopy at spaced points about said outer periphery and another group of suspension lines connected to said means at spaced points about said lower inner edge and extending in upward and downward directions from said points to points on the first group of suspension lines spaced from the periphery of the load supporting portion of the canopy.

6. A parachute having a canopy with an upper load supporting portion, means presenting air deflecting surfaces inclined inward and downward from the outer periphery of said load supporting canopy portion to a lower inner edge, a group of suspension lines connected to the load supporting portion of the canopy at spaced points about said outer periphery, and another group of suspension lines connected to said air deflecting means at spaced points about said lower inner edge, the suspension lines of said groups being connected together above and below the outer periphery of the load supporting portion of the canopy.

7. A parachute having a canopy with an upper load supporting portion, means presenting air deflecting surfaces inclined inward and downward from the outer periphery of said load supporting canopy portion to a lower inner edge, a group of suspension lines connected to the load supporting portion of the canopy at spaced points about said outer periphery, and another group of suspension lines connected to said air deflecting means at spaced points about said lower inner edge and connected to said canopy at points located inward from the outer periphery of the load supporting portion of the canopy, the suspension lines of one group being connected to the suspension lines of the other group at points below the lower inner edge of the air deflecting means.

8. A parachute having a canopy with an upper load supporting portion, means presenting air deflecting surfaces inclined inward and downward from the outer periphery of said load supporting canopy portion to a lower inner edge, a group of suspension lines connected to the load supporting portion of the canopy at spaced points about said outer periphery and another group of suspension lines secured to those suspension lines connected to the periphery of the load supporting canopy portion and extending substantially vertically therefrom to spaced points about said lower inner edge and thence extending on upward and connected to said canopy at points located inward from the outer periphery of the load supporting portion of the canopy.

9. Stabilizing means for use with a parachute comprising annular air deflecting means adapted to be connected to the suspension lines of the parachute below the periphery of the canopy and when so connected presenting surfaces inclined inwardly and downwardly below the outer periphery of the parachute canopy throughout the circumference of the parachute.

10. A parachute having a canopy with an upper load supporting portion, suspension lines connected to the canopy adjacent the outer periphery of said load supporting portion, and means connected to the suspension lines presenting an inwardly and downwardly inclined air deflecting surface extending about the parachute and having its upper edge located below and substantially parallel to the outer periphery of said load supporting portion of the canopy.

11. A parachute having a canopy with an upper load supporting portion, suspension lines connected to the canopy adjacent the outer periphery of said load supporting portion, and air deflecting means connected to said suspension lines below the outer periphery of the load supporting portion of the canopy and presenting an annular inwardly and downwardly inclined surface, there being an air vent between said air deflecting means and the outer periphery of the load supporting portion of the canopy.

12. A parachute having a canopy with an upper load supporting portion, suspension lines connected to the canopy adjacent the outer periphery of said load supporting portion, and means connected to the suspension lines presenting an inwardly and downwardly inclined air deflecting surface extending about the parachute and in the form of a strip of fabric material approximately equal in width to from 5 to 20% of the diameter of the load supporting portion of the canopy when in use.

13. A parachute having a canopy with an upper load supporting portion, suspension lines connected to the canopy adjacent the outer periphery of said load supporting portion, and means connected to and crossed by the suspension lines presenting an inwardly and downwardly inclined air deflecting surface extending about the parachute and in the form of a strip of fabric material approximately equal in width to from 5 to 20% of the diameter of the load supporting portion of the canopy when in use, during descent maintained at an angle of from about 30 to 75° from a plane passing through the periphery of said load supporting portion.

14. A parachute having a canopy with an upper load supporting portion, suspension lines connected to the canopy adjacent the outer periphery of said load supporting portion, and means connected to the suspension lines presenting an inwardly and downwardly inclined air deflecting surface extending about the parachute and in the form of a strip of fabric material of substantial width maintained at an angle of from 30 to 75° from a plane passing through the periphery of said load supporting portion.

15. A parachute according to claim 2, wherein said suspension lines extend generally longitudinally of the parachute across said means.

16. A parachute according to claim 3, wherein said suspension lines extend generally longitudinally of the parachute across said means.

17. In a parachute, a canopy having a relatively flat camber top formed with an annular inwardly and downwardly tapered surface extending therefrom at its periphery to form an abrupt air spoiler edge therebetween, shroud lines each extending across the top of the canopy exteriorly thereof from the apex of the canopy to a point intermediate the apex and the periphery and extending interiorly of the canopy from said point to the lower edge of the canopy in spaced relation to the canopy interior.

18. In a parachute, a canopy having an upper surface formed with a relatively low camber, and having an annular skirt portion tapering inwardly and downwardly toward the canopy descent axis from the periphery of the upper surface, forming a relatively sharp air deflecting edge at the periphery of the canopy and an unobstructed annular upwardly and outwardly air diverting surface between the lower edge of the skirt portion and the canopy periphery, and shroud lines extending into the interior of the canopy skirt portion next to the lower edge thereof and then extending upwardly and inwardly in spaced relation to the periphery of the upper surface of the canopy, joining the upper surface at points radially inward of its periphery.

19. In a parachute, an annular canopy having a low cambered top portion, an unobstructed annular air deflecting skirt portion inclining downwardly and inwardly from the periphery of the top portion relative to the descent axis of the canopy, to deflect air flowing past the lower edge of the skirt portion, outwardly beyond the periphery of the top portion and away from the upper surface of the canopy, and shroud lines passing within the confines of the annular deflecting skirt portion in spaced relation to the periphery of the top portion, and connected to the top portion at spaced points located intermediate the periphery and the apex of the canopy top portion.

20. A parachute comprising a fabric canopy, a plurality of load suspension lines secured to said canopy equidistantly about the skirt perimeter thereof, said suspension lines converging inward from the canopy skirts perimeter to the point of load attachment and lying substantially in the lateral surface of an inverted cone, a stabilizing annular fabric band means encircling the load suspension lines and secured across the width thereof to each of said suspension lines, said annular band means lying on the surface of the cone in which the suspension lines lie, the upper edge of said band means being adjacent the perimeter of the canopy but leaving a narrow vent space therebetween for restricting spillout airflow adjacent the canopy periphery and the diameter of the lower edge of said band means being slightly less than the inflated skirt diameter of the canopy to restrict inflow to the canopy and reduce opening shock during inflation.

CONRAD S. KOWALSKI.

REFERENCES CITED

The following references are of record in the file of this patent:

UNITED STATES PATENTS

| Number | Name | Date |
|---|---|---|
| 1,264,050 | Fuji | Apr. 23, 1918 |
| 1,499,266 | Vieregg | June 24, 1924 |
| 2,307,000 | Hart | Dec. 29, 1942 |

FOREIGN PATENTS

| Number | Country | Date |
|---|---|---|
| 89,915 | Austria | Nov. 10, 1922 |
| 367,314 | Italy | Jan. 20, 1939 |
| 22,283 | Great Britain | of 1912 |
| 553,653 | France | Feb. 14, 1923 |
| 574,109 | France | Mar. 24, 1924 |